United States Patent Office 3,694,256
Patented Sept. 26, 1972

---

3,694,256
PROCESS FOR RENDERING CELLULOSIC TEXTILES FLAME RETARDANT
Donald J. Daigle and Leon H. Chance, New Orleans, and George J. Drake, Jr., Metairie, La., assignors to the United States of America as represented by the Secretary of Agriculture
No Drawing. Original application Aug. 29, 1969, Ser. No. 854,326, now Patent No. 3,607,944. Divided and this application Jan. 12, 1971, Ser. No. 105,941
Int. Cl. C09k 3/28; D06m 13/28
U.S. Cl. 117—136                4 Claims

---

ABSTRACT OF THE DISCLOSURE

Cellulosic textiles are rendered flame retardant by impregnation with aqueous solutions of bis(chloromethyl)phosphorylmethyltriphenyl phosphonium halides.

---

This application is a division of application Ser. No. 854,326, filed Aug. 29, 1969, now U.S. Pat. No. 3,607,944.

A non-exclusive, irrevocable, royalty-free license in the invention herein described, throughout the world for all purposes of the United States Government, with the power to grant sublicenses for such purposes is hereby granted to the Government of the United States of America.

This invention relates to the triphenylphosphine adducts of haloalkyl phosphine oxides and to phosphine methylenes derived therefrom, which are useful as flame retardants for cellulosic textiles. More specifically, this invention relates to some new bis(halomethyl)phosphorylmethyltriphenylphosphonium halides, to new stable triphenylphosphine bis(halomethyl)phosphorylmethylenes, and to methods of their preparation.

The main object of the instant invention is to disclose the new phosphonium halide types produced by processes of the instant invention.

A second object of the instant invention is to disclose a new stable phosphine methylene produced by processes of the instant invention.

Searching the prior art we find that the simplest process for the preparation of phosphonium halides is conducted by reacting an alkyl halide with a tertiary phosphine oxide [Kosolapoff, G. M. Organophosphorus Compounds, John Wiley and Sons, Inc., New York, p. 78 (1950)]. The phosphonium halides of the present invention differ from those of the prior art in that haloalkylphosphine oxides are employed rather than simple alkyl halides. Thus the phosphonium halides of the present invention are of a new type.

In the course of the investigation we have found that phosphonium halides having the graphic formula

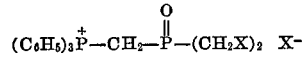

where X represents a halogen, can be prepared by reacting triphenyl phosphine with tris(chloromethyl)phosphine oxides having the graphic formula

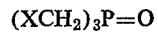

where X is a halogen.

We have also found that only when X is chlorine in phosphonium halides of the graphic formula

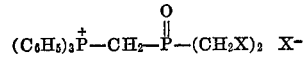

does one obtain a phosphine methylene of the formula

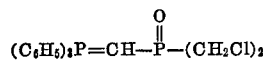

when the phosphonium halide is treated with a base. When X is bromine or iodine the phosphine methylene is not obtained.

We have also found that a compound containing mixed halogens, viz, bis(chloromethyl)phosphorylmethyltriphenylphosphonium bromide, can be prepared by the reaction of triphenylphosphine bis(chloromethyl)phosphorylmethylene with bromine.

In accordance with the present invention the reaction of triphenylphosphine with tris(halomethyl)phosphine oxides is carried out by heating the two reactants in an appropriate solvent. The solvent may be a nonpolar solvent such as benzene or a polar solvent such as isobutyl alcohol. The preferred solvent for the chloromethyl and bromomethyl phosphine oxides is benzene, and for the iodomethyl phosphine oxide, isobutyl alcohol. The preferred reaction temperatures are the reflux temperatures of the particular solvent. The phosphonium halide products were identified by infrared and proton magnetic resonance spectra, by formation of picrate derivatives, and by elemental analyses.

In accordance with the present invention triphenylphosphine bis(chloromethyl)phosphorylmethylene was prepared by reaction of bis(chloromethyl)phosphorylmethyltriphenylphosphonium chloride with an aqueous base. The preferred base is ammonium hydroxide.

The phosphonium halides are useful as flame retardants for cellulosic materials and also as intermediates to other chemical compounds. Cotton fabric was made flame retardant by impregnating the fabric with a 15% aqueous solution of the phosphonium halides and drying the fabric. The concentration of the flame retardant may be varied above or below 15% depending on the degree of flame retardancy desired.

The following examples illustrate the methods of carrying out the invention, and are included for purposes of illustration, not as a limitation thereof.

EXAMPLE 1

Preparation of bis(chloromethyl)phosphorylmethyltriphenylphosphonium chloride (I)

Tris(chloromethyl)phosphine oxide (3.0 grams, 0.0153 mole) was refluxed with triphenylphosphine (4.19 grams, 0.016 mole) in benzene for 18 hours. The resulting solution was filtered and yielded 5.8 grams (83% yield) of crude product. Recrystallization of I from methanol-benzene yielded a pure product, M.P. 230°–231.5° C.

*Analysis.*—Calcd. for $C_{21}H_{21}Cl_3OP_2$ (percent): C, 55.11; H, 4.63; Cl, 23.24; P, 13.29. Found (percent): C, 55.45; H, 4.86; Cl, 22.72; P, 13.29.

The picrate of I had a melting point of 164.5–66° C.
*Analysis.*—Calcd. for $C_{27}H_{23}Cl_2N_3O_7P_2$ (percent): N, 6.46; Cl, 10.90; P, 9.52. Found (percent): N, 6.40; Cl, 10.63; P, 9.02.

EXAMPLE 2

Preparation of bis(chloromethyl)phosphorylmethyltriphenylphosphonium bromide (II)

The same procedure as that used for the preparation of I, Example 1, was followed to produce an 87% yield of crude II. Pure white crystals, M.P. 226–228° C., were obtained by recrystallization from a methanol-benzene mixture.

*Analysis.*—Calcd. for $C_{21}H_{21}Br_3OP_2$ (percent): C, 42.67; H, 3.58; Br, 40.56; P, 10.48. Found (percent): C, 44.11; H, 4.14; Br, 39.45; P, 10.53.

The picrate of II had a melting point of 182–3.5° C.
*Analysis.*—Calcd. for $C_{27}H_{23}Br_2N_3O_7P_2$ (percent): N, 5.68; Br, 21.61; P, 8.38. Found (percent): N, 5.44; Br, 20.32; P, 8.08.

EXAMPLE 3

Preparation of bis (iodomethyl)phosphorylmethyltriphenylphosphonium iodide (III)

The same procedure as that used for the preparation of I, Example 1, was followed except isobutyl alcohol was used as the solvent. An 85% yield of crude white crystals was obtained, M.P. 228–229° C. after recrystallization from water.

Analysis.—Calcd. for $C_{21}H_{21}I_3OP_2$ (percent): C, 34.45; H, 2.89; I, 52.00; P, 8.46. Found (percent): C, 34.98; H, 3.12; I, 52.13; P, 8.26. The picrate of III had a melting point of 167–8° C. Analysis.—Calcd. for $C_{27}H_{23}I_2N_3O_7P_2$ (percent): N, 5.04; I, 30.46; P, 7.43. Found (percent): N, 4.85; I, 30.16; P, 7.13.

EXAMPLE 4

Preparation of triphenylphosphine bis(chloromethyl)phosphorylmethylene (IV)

I (2.5 g., 0.00546 mole) was dissolved in 75 ml. of water. Upon the addition of 75 ml. of a 2% aqueous ammonium hydroxide solution, a thick oily substance separated, which with shaking eventually turned into a white solid. The yield of crude IV was 1.42 g. (62%). White crystals, M.P. 129–30° C., were obtained by recrystallization from benzene-hexane.

Analysis.—Calcd. for $C_{21}H_{20}Cl_2OP_2$ (percent): C, 59.71; H, 4.73; Cl, 16.82; P, 14.69. Found (percent): C, 59.30; H, 4.66; Cl, 16.28; P, 14.59.

EXAMPLE 5

Preparation of bis(chloromethyl)phosphorylmethyl triphenylphosphonium bromide (V)

IV (0.5 g. 0.00119 mole) was dissolved in 50 ml. of methylene chloride and a bromine solution of methylene chloride added until a slight orange color persisted. Evaporation of the solvent gave a semisolid which was dissolved in either methanol or methylene chloride and benzene added until the solution became cloudy. A white compound weighing 0.42 g. (70%) was obtained, M.P. 225–7° C.

Analysis.—Calcd. for $C_{21}H_{21}BrCl_2OP_2$ (percent): C, 50.20; H, 4.18; Br, 15.94; P, 12.35. Found (percent): C, 50.36; H, 4.25; P, 12.28; Br, 16.65.

EXAMPLE 6

Fabric treatment

A water solution containing 15% by weight of bis(chloromethyl)phosphorylmethyltriphenylphosphonium chloride was applied to 8 oz. cotton sateen fabric by passing through squeeze rolls to an 80% wet pickup and drying for 5 minutes at 80° C. The fabric had a 12% weight gain and was flame retardant.

Fabric was made flame retardant in a similar manner with the bromo- and iodo-analogs.

The fabric treatments were evaluated by a well known rapid evaluation flame retardancy test which consists of cutting a small specimen (about 1 cm. x 7 cm.) of the fabric to be evaluated, placing the specimen above the flame of a kitchen match with the long axis of the fabric specimen at an angle of 180° to thé flame, igniting the specimen (if it can ignite), removing the flaming specimen from the flame, and rotating the specimen until the flame is extinguished, and recording that angle. (The 0° angle would be where the flame is at the top of the specimen, and the most severe test would be where the flame would be at the bottom. This would be the 180° angle.)

The specimens of Example 6 did not support combustion upon being submitted to this rapid evaluation test; therefore, they passed the flame retardancy test.

We claim:

1. A process for imparting to cellulosic textiles the quality of flame retardancy, comprising:
   (a) impregnating the cellulosic textile with an aqueous solution, about 15% by weight, of a phosphorus containing halide selected from the group consisting of:
      bis(chloromethyl)phosphorylmethyltriphenylphosphonium chloride,
      bis(chloromethyl)phosphorylmethyltriphenylphosphonium bromide, and
      bis(chloromethyl)phosphorylmethyltriphenylphosphonium iodide, to obtain a wet pickup of about 80%, and
   (b) drying the wet impregnated textile for about 5 minutes at about 80° C. to obtain a treated fabric with about 12% weight gain.

2. The process of claim 1 wherein the phosphorus containing halide is bis(chloromethyl(phosphorylmethyltriphenylphosphonium chloride.

3. The process of claim 1 wherein the phosphorus containing halide is bis(chloromethyl)phosphorylmethyltriphenylphosphonium bromide.

4. The process of claim 1 wherein the phosphorus containing halide is bis(chloromethyl)phosphorylmethyltriphenylphosphonium iodide.

References Cited

UNITED STATES PATENTS

| | | | |
|---|---|---|---|
| 2,574,515 | 11/1951 | Walter et al. | 117—136 X |
| 2,668,096 | 2/1954 | Reeves et al. | 117—136 UX |
| 3,524,886 | 8/1970 | Fried | 260—606.5 |
| 3,426,073 | 2/1969 | Birum et al. | 260—606.5 |
| 3,445,570 | 5/1969 | Birum et al. | 260—606.5 X |

WILLIAM D. MARTIN, Primary Examiner

H. J. GWINNELL, Assistant Examiner

U.S. Cl. X.R.

117—143 R; 252—8.1